May 25, 1954
A. R. RUTH
2,679,432
TRUCK BOW ATTACHING MEANS
Filed Feb. 19, 1953
2 Sheets-Sheet 1
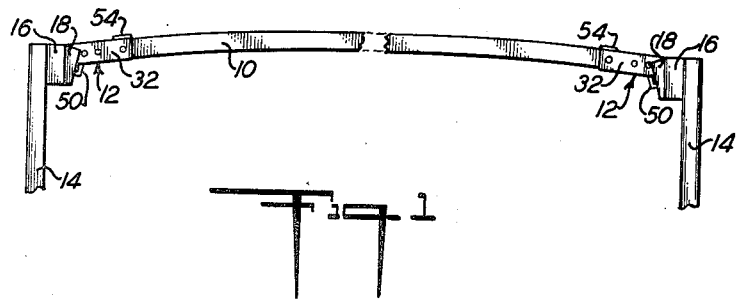
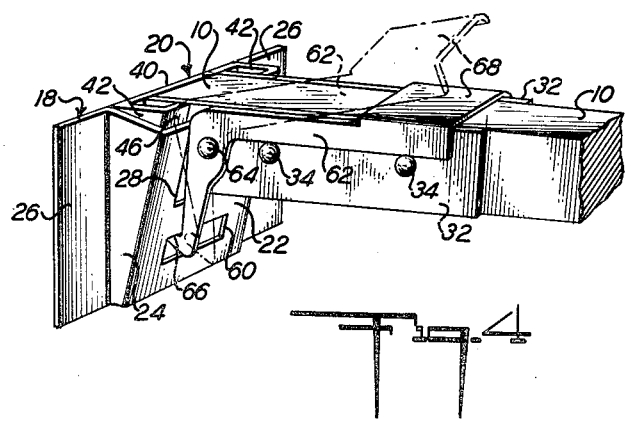
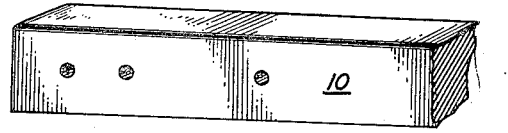
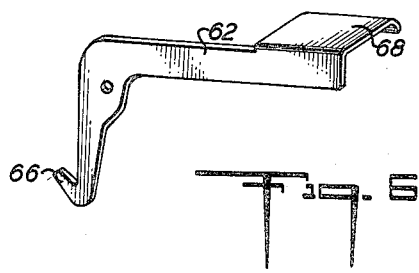
INVENTOR
ACQUILLA R. RUTH
BY *[signature]*
ATTORNEY

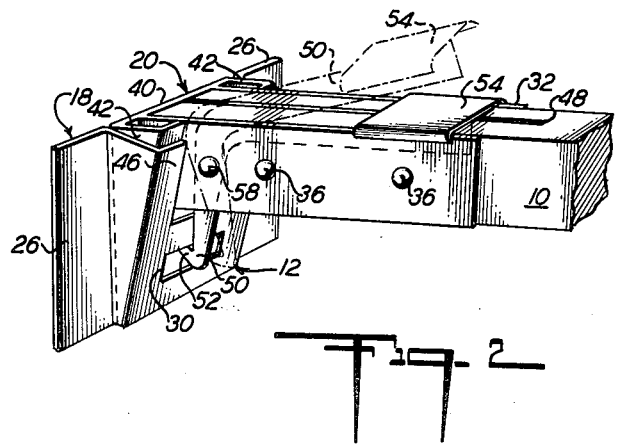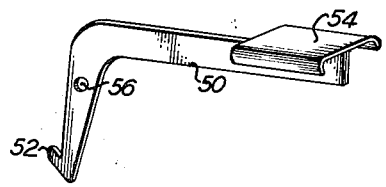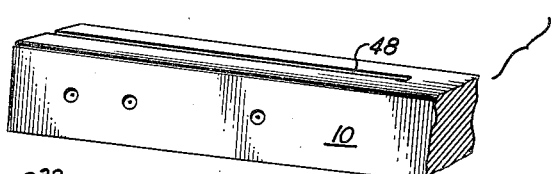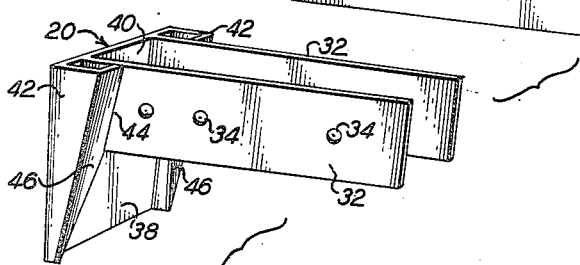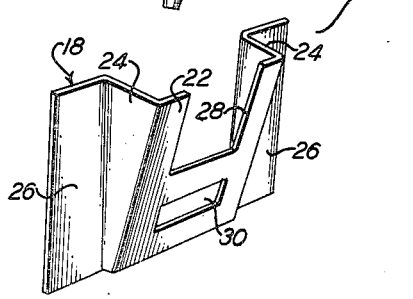
INVENTOR.
ACQUILLA R. RUTH
BY
ATTORNEY Patented May 25, 1954

2,679,432

UNITED STATES PATENT OFFICE 2,679,432

TRUCK BOW ATTACHING MEANS

Acquilla R. Ruth, York, Pa.

Application February 19, 1953, Serial No. 337,734

13 Claims. (Cl. 296—40)

This invention relates to improvements in truck bow attaching means and, more particularly, attaching means of a hardware nature which can be sold as an article of manufacture. In its preferred embodiment, the attaching means comprises two interengageable parts which are respectively and easily adaptable permanently to the side of a truck body and one end of a truck bow.

In truck bow attaching means used at present, several types of rather unsatisfactory mechanisms are employed, most of these not having means for rendering the bow tightly connected to the side of the truck body, whereby the same is noisy and the bow can accidentally be disconnected from the side of the truck body. In other arrangements, truck bows are permanently connected to the truck bodies whereby the bows may not be disconnected and this is unsatisfactory where a desired load might be carried more easily if the bows could be disconnected so as to facilitate either loading or accommodating the load to the truck body.

The present invention provides relatively inexpensive, rugged, and durable interfitting means which permit easy and ready disconnection of truck bows from a truck body and yet, when the bows are attached to a truck body, the connection of the bows to the body is firm and of such nature that accidental disconnection of the bows from the body is not possible.

It is another object of the invention to provide truck bow attaching means comprising interfitting members which are of a hardware nature and preferably formed by simple stamping and bending operations from suitable sheet metal, for example.

Still another object of the invention is to provide truck bow attaching means comprising interfitting members respectively having substantial areas that interengage when the interfitting members are operatively assembled, whereby wear upon said interfitting parts is reduced to a minimum.

As a corollary to the foregoing object, said attaching means are so arranged that said substantial areas of said interfitting members are in frictional engagement with each other when the members are operatively assembled and, therefore, such engagement aids in preventing accidental separation of said members during use.

One further object of the invention is to provide in said attaching means several embodiments of effective and relatively inexpensive latching means which may be used, if desired, to positively prevent accidental separation of the interconnected parts of the attaching means.

Details of the foregoing objects and of the invention, as well as other objects thereof, are set forth in the following specification and illustrated in the accompanying drawings comprising part of the same.

In the drawings,

Fig. 1 is a fragmentary vertical elevation of an exemplary truck bow attached to the upper portions of fragmentary sides of a truck body, said bow being attached to said body by means embodying the present invention.

Fig. 2 is a perspective view of one embodiment of bow attaching means in which the principles of the present invention have been incorporated, said view being on a considerably larger scale than Fig. 1.

Fig. 3 is an exploded perspective view of the truck bow attaching means illustrated in Fig. 2 which illustrates details of the interconnectible parts comprising said attaching means.

Fig. 4 is a perspective view similar to Fig. 2 but illustrating another embodiment of the invention.

Fig. 5 is a fragmentary perspective view of one end of a truck bow prepared to be attached to the embodiment of attaching means illustrated in Fig. 4.

Fig. 6 is a perspective view of the latch member per se included in the embodiment of attaching means shown in Fig. 4.

Referring to the drawings, Fig. 1 shows an exemplary transverse arched truck bow 10 connected by attaching means 12 to the sides 14 of a truck, said sides 14 merely representing fragmentarily the upper portions of conventional sides of a truck. In this exemplary illustration, upper side rails 16 are shown to which the attaching means 12 are connected but it will be understood that, if convenient and preferable, the attaching means 12 may be directly connected to the sides 14 of a truck if, for example, no side rails are provided.

In Fig. 2, one embodiment of truck bow attaching means 12 is illustrated in larger scale than Fig. 1 and it will be seen that the attaching means 12 comprises a bracket 18 and a head member 20 which respectively have interfitting and interengaging surfaces described in greater detail hereinafter.

Considering the bracket 18, it will be seen that said bracket has a front member 22 and the opposite ends thereof are integrally connected to side member 24, the opposite edges of each side member being angularly related, whereby the same are somewhat wedged-shaped as is clearly evident from Figs. 2 and 3. Attaching ears 26 are integrally connected to one edge of each of the side members 24 and said ears are directly attachable to either the sides 14 or the side rails 16 of a truck, either by welding the same thereto or by bolting or riveting the same thereto, as desired. If the latter means are used for attaching the brackets, obviously suitable holes may be formed in the ears 26. The front member 22 has a notch 28 extending downward from the upper edge thereof and the lower portion of said front member is also provided with a preferably rectangular aperture 30 for purposes of receiving the locking detent of a latch to be described hereinafter.

In its preferred embodiment, the bracket 18 is readily formed by stamping and bending operations from sheet metal such as steel, of suitable gauge. Such means of manufacture will result in the cost of the bracket being at a minimum. It will also be seen that when the bracket 18 is attached to either the side 14 or a side rail 16 of a truck body, for example, a wedge-shaped socket will be provided which opens upwardly as is clearly evident from Fig. 1.

Arranged to interfit with the bracket 18 is a head member 20 which, like the bracket 18, is formed in its preferred embodiment from sheet metal such as steel of suitable gauge. For example, but without restriction thereto, sheet steel of approximately one-eighth inch thickness is well suited for said bracket and head member.

Head member 20 comprises leg means which are preferably in the form of a pair of parallel strips 32 which are provided with suitable apertures 34 for purposes of directly securing the strips 32 to opposite sides of one end of a truck bow 10. Rivets 36 may be used to effect such securing or, if preferred, bolts may be used. The head member 20 also comprises a head 38 formed preferably from sheet metal of similar gauge to the strips 32 and said head includes an end section 40 which extends transversely to the leg means 32 and projects in opposite directions laterally therefrom, each of the outer ends of said end section 40 being bent twice at right angles as clearly shown in Figs. 2 and 3, whereby said head 38, in plan view, has a pair of oppositely extending lugs 42 which are each U-shaped in plan view and are therefore hollow. This renders them relatively light weight while affording substantial area thereto. The extremities of the two ends of the end section 40 which have been bent as described above are directed toward each other and said extremities abut the outer surfaces of the strips 32 and are welded thereto as indicated at 44. Preferably, the inner ends of strips 32 also are welded to the inner surface of end section 40.

In side elevation, as shown in Figs. 2 and 3, the lugs 42 are tapered complementarily to the socket of the bracket 18. The inturned extremities 46 of lugs 42 are substantially flat and engage preferably flatly and frictionally with the inner surface of the front member 22 of bracket 18 when the head member 20 is operatively positioned within the bracket 18. It will readily be seen that the surfaces afforded by the inturned extremities 46 of head 38 are substantial and, when co-engaging the inner surfaces of front member 22 of bracket 18, considerable frictional area is afforded. Considering further the fact that the socket of bracket 18 is flared upwardly, and lugs 42 are complementary thereto in side elevation, gravity acts constantly to wedge the head member 22 firmly into the socket of bracket 18 so as to minimize the possibility of the head member and the end of the bow from becoming disconnected from the bracket 18.

The substantial areas of the inturned extremities 46 also insure a minimum of wear between the head member 20 and the bracket 18 during use. Furthermore, the manner of forming the lugs 42 results in a relatively inexpensive method of forming rugged and durable lugs providing substantial areas which extend transversely in opposite directions to the leg means 32 and the T-shaped formation of the head member 20, as seen in plan view, affords an arrangement which, when positioned within the socket of bracket 18, results in a construction that resists bending movement of the bow relative to the side of the truck in a horizontal direction transverse to the axis of the bow 10. Further, though areas of substantial size are provided on head member 20 which engage bracket 18, said head is relatively light in weight due to the particular construction thereof.

The above described construction will result in effective frictional anchoring of the head member 20 within the bracket 18, particularly since the notch 28 in the bracket 18 accommodates one end of the bow 10 and the leg means 32 of the head member 20 connected to the bow. Such reception of the head member within the notch results in a maximum of vertical dimension of frictional co-engaging areas on the head member 20 and socket 18 with a minimum of overall vertical dimension of the bracket 18.

While the frictional co-engagement between the head member 20 and bracket 18 is such as to provide for adequate retention of the head member within the bracket under normal operation, the present invention also contemplates the use of latch mechanism including co-engageable means on the head member and bracket for positively locking the head member to the bracket when the same are operatively positioned in interfitting relationship. One embodiment of such latching means is shown in Figs. 2 and 3 wherein a normally vertical slot 48 extends inward from one end of the bow 20, substantially midway thereof, for purposes of receiving an L-shaped latch 50 having a locking detent 52 projecting from one end thereof and a handle plate 54 fixed by welding or otherwise to the opposite end of said latch.

An aperture 56 extends through the latch 50 adjacent the angle therein and a suitable pin or rivet 58 extends through the end of the bow 10 and leg means 32 as well as through the aperture 56 pivotally to connect the latch to the bow and the head member 20. The locking detent 52 is received in slot 30 of bracket 18 when the handle plate 54 is disposed against the top surface of the bow 10 as shown in full lines in Fig. 2. Normally, a top covering of some kind is used, such as a canvas, on a truck of the nature described and said canvas or other covering will rest upon the handle plate 54 during use and thereby serve to maintain the same against the bow 10, correspondingly maintaining the detent 52 within slot 30. This thus insures that the bow 10 will positively be latched to the bracket 18 as well as the side of the truck. When the canvas or other covering is removed from the truck top, the handle plate 54 may readily be manipulated manually to disconnect the detent 52 from the slot 30 by moving the latch to the dotted line position thereof shown in Fig. 2. Upon pushing upward against the underside of the bow 10 and head member 20, the latter is easily and readily separated from the bracket 18. The tapered nature of the socket in bracket 18 and the lugs 42 also aids in fitting the head member 20 into said socket when the bow 10 is being mounted in operative position on a truck.

The embodiment of truck bow attaching means illustrated in Figs. 4 through 6 is, basically, similar to the embodiment shown in Figs. 2 and 3. The bracket 18 and the head member 20 are substantially identical in both embodiments with the exception that, in the bracket 18 of the second embodiment shown in Fig. 4, a slightly longer aperture 60 is provided as compared with the aperture 30 of the bracket 18 of the first embodiment shown in Figs. 2 and 3. In the latter the locking detent 52 is arranged substantially centrally between the strips 32, whereby the aperture 30 need not be unduly long. However, in the second embodiment shown in Fig. 4, a latch 62 is pivotally secured by a screw or rivet 64 to the outer surface of one of the strips 32 comprising the leg means of the head member 20. Latch 62 is preferably formed from sheet metal of a gauge similar to that from which the bracket 18 and the head member 20 are formed.

It will be noted that the bracket 62, as clearly shown in Figs. 4 and 6, is L-shaped and may be formed by a stamping operation from sheet metal. One end of the latch 62 is provided with a locking detent 66, the function thereof being similar to the detent 52 of the first embodiment. That is, the locking detent 66 is received within aperture 60 when the latch is disposed in latching position shown in full lines in Fig. 4. The detent 66 is received within the aperture 60 adjacent one end thereof but the aperture 60 is preferably sufficiently long that it will accommodate the detent regardless of whether the bow 10 is mounted in the brackets with the latches 60 facing forwardly or rearwardly of the truck body. That is, anyone mounting the bows on the truck body may disregard the position of the latches when inserting the head members 20 in the sockets of the brackets 18.

It will also be noted that the outer surfaces of the detents 52 and 66 are shaped so as to slope outwardly and upwardly, whereby in the event the latches are in locking position when the bow 10 is being attached to the brackets 18, said surfaces on the detents automatically will cam the detents in a direction to permit the latches to clear the front member 22 of each of the brackets. When the head members 20 on each end of the bow are fully inserted in the sockets of the brackets 18, the latches may then be moved to locking position in which the detents 52 and 66 respectively are received in the apertures 30 and 60.

In the embodiment shown in Figs. 4 through 6 the latch 62 is provided with a flat handle leaf 68 formed preferably, for example, from the same material as the latch 62 by a single stamping operation and said leaf is then bent at a right angle to the plane of the latch 62 as is clearly shown in Figs. 4 and 6. When the latch is positioned in latching position shown in full lines in Fig. 4, it will be seen that the leaf 68 rests upon the upper surface of the bow 10 wherein it is not only held by gravity in counter-weighting fashion for the locking detent but also by any cover which will rest thereupon when supported upon the bows 10, thus insuring maintenance of the latch 62 in latching position during use.

In both embodiments, the latching effect of the respective latches supplements the frictional coengagement of the inturned extremities 46 of the head member 20 with the inner surfaces of front member 22 of bracket 18.

From the foregoing it will be seen that the present invention provides sturdy and rugged, but relatively light weight, attaching means by which the ends of a truck bow may be secured detachably to the opposite sides of a truck body. Said attaching means may be sold in sets comprising a head member and a bracket and these elements respectively are readily attachable to the bows and sides of a truck. In the preferred embodiment of the invention, several different types of latching means also are included to insure positive retention of the bow ends in the brackets fixed to the sides of the truck.

The components of the attaching means are well suited to be formed inexpensively by stamping operations from sheet metal and with a few simple bending operations and some welding, rugged and light weight interfitting members are formed. The latches of both embodiments are of such nature that not only gravity aids in maintaining them in latched position but a cover supported upon the truck bows also engages the latches in such a way as to hold them in latched position. Further, the brackets preferably define a tapered socket which flares upwardly and the head means attached to the ends of the bows are complementarily tapered, whereby gravity and jostling of a truck during use serve constantly to wedge the head members into firmer frictional engagement with the brackets as well as also to facilitate the introduction of said head members into said brackets when mounting said bows on a truck.

While the invention is shown and described in its several preferred embodiments, and has included certain details, it should be understood that the invention is not to be limited to the precise details herein illustrated and described since the same may be carried out in other ways falling within the scope of the invention as claimed.

I claim:

1. Truck bow attaching means comprising in combination, a bracket member arranged to be attached to a side member of a truck body, said bracket member comprising a sloping front member and tapered side members attached to the ends thereof to define relative to said truck side member a socket open at the top and tapering outward from the bottom toward the open top thereof, a head member comprising leg means arranged to be secured to one end of a truck bow and a wedge shaped end structure complementary to said socket and connected to said leg means and projecting laterally from said leg means, said end structure also normally extending substantially below said leg means and having substantially flat surfaces extending transversely between the outer extremity thereof and said leg means and engageable respectively substantially flatly with the inner surface of the front member of said bracket member and a surface opposite the same defining said socket when said head is disposed within the socket of said bracket.

2. The attaching means of claim 1 in which said end structure of said head member extends below and across said leg means and the front member of said bracket has a notch therein extending downward from the upper edge thereof a greater distance than the vertical dimension of said leg means and receiving said leg means of said head member when the latter is operatively positioned within said bracket, whereby said head member may be firmly seated within said bracket.

3. The attaching means of claim 1 further including latching means for said bracket member and head member comprising a latch movably carried by one of said members and releasably co-engageable with latch receiving means on the other member when said head member is operatively positioned in the socket of said bracket.

4. Truck bow attaching means comprising in combination; a sheet metal bracket having a front member, tapered side members at the ends thereof bent substantially transversely thereto, and ears extending substantially transversely from said tapered side members, said ears being attachable to the surface of a side of a truck body and when so attached said front and side members cooperating with said side surface of a truck body to form a socket tapering outward in an upward direction and open at the top; and a head member comprising sheet metal leg means arranged to be secured to the ends of a truck bow, and a head formed from sheet metal and connected to said leg means and shaped to provide a hollow tapered lug projecting laterally from said leg means and complementary in shape to said socket in said bracket, said lug having substantially flat surfaces extending transversely between the outer extremity thereof and respectively substantially flatly and frictionally engageable with the inner surface of the front member of said bracket and a surface opposite the same defining said socket when said head is positioned within the socket of said bracket, said lug extending normally below said leg means and being wedged by gravity within said socket during use.

5. The attaching means of claim 4 further characterized by the head of said head member being formed from sheet metal and including an end section extending transversely to said leg means and projecting laterally in opposite directions and the ends of said end section being bent so that each of said ends is substantially U-shaped in plan view and the extremities of said ends being connected to said leg means and also being substantially flat and arranged to engage flatly against the inner surface of the front member of said bracket when said head is disposed therein in operative position.

6. The attaching means of claim 5 in which the front wall of said bracket has a notch therein extending downward and substantially centrally from the upper edge in use, said notch being of sufficient size so as readily to receive said leg means of said head means and bow end when attached thereto and said head means is positioned within said bracket.

7. Truck bow attaching means comprising in combination, a bracket member arranged to be attached to a side member of a truck and providing a socket extending vertically and horizontally in parallelism to said side member of said truck, a head member having leg means arranged to be attached to one end of a truck bow and a head extending transversely to the outer end thereof in opposite directions therefrom, whereby said head is substantially T-shaped in plan view when positioned for use, said head being receivable within said socket of said bracket and operable when therein to resist lateral movement of a truck bow relative to a truck body in a horizontal direction when attached thereto, and a latch lever mounted pivotally relatively to said head member and having a locking detent thereon engageable with said bracket to hold said head detachably latched to said bracket and the other end of said latch lever comprising a handle operable as a counterweight acting normally to maintain said locking detent in latching position.

8. The attaching means of claim 7 further characterized by said locking detent having a cam face thereon engageable with said bracket to cam said detent to inoperative position while moving said head to operative position within said socket.

9. The attaching means of claim 7 in which said latch lever is substantially L-shaped and one leg thereof extends longitudinally of said leg means in latching position and the other leg thereof has the locking detent thereon.

10. The attaching means of claim 9 in which said one leg of said latch has a manipulating handle thereon which is positioned to be disposed against the upper surface of a bow when in latching position, whereby a cover on a truck supported by said bow will be engageable with said handle and serve to maintain said lever in latching position.

11. The attaching means of claim 10 in which the leg means of said head member comprises a pair of legs and said latch lever is arranged to be positioned therebetween and the handle on said lever is plate-like and extends horizontally in use and is arranged to rest upon the top surface of a truck bow when in latching position.

12. The attaching means of claim 10 in which said latch lever is pivotally supported by one surface of said leg means of said head member and the handle means on said lever comprises a plate extending transversely to said lever and is disposed horizontally and against the top of a truck bow in use when in latching position.

13. The attaching means of claim 12 in which said latch lever is a flat stamping and the handle is bent transversely to and is integral with said lever.

References Cited in the file of this patent

UNITED STATES PATENTS

| Number | Name | Date |
| --- | --- | --- |
| 1,630,001 | Gardner | May 24, 1927 |
| 2,450,589 | Falk et al. | Oct. 5, 1948 |